(12) United States Patent  
Nakao (10) Patent No.: US 8,731,368 B2  
(45) Date of Patent: May 20, 2014

(54) VIDEO DATA PROCESSING APPARATUS AND VIDEO DATA PROCESSING METHOD

(75) Inventor: Akihiko Nakao, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 320 days.

(21) Appl. No.: 13/192,290

(22) Filed: Jul. 27, 2011

(65) Prior Publication Data

US 2012/0082438 A1 Apr. 5, 2012

(30) Foreign Application Priority Data

Oct. 5, 2010 (JP) ................................. 2010-226016

(51) Int. Cl.  
*H04N 9/80* (2006.01)

(52) U.S. Cl.  
USPC ......................................................... 386/241

(58) Field of Classification Search  
None  
See application file for complete search history.

(56) References Cited

U.S. PATENT DOCUMENTS

| | | | |
|---|---|---|---|
| 5,574,570 A | | 11/1996 | Ohkuma et al. |
| 5,991,502 A | * | 11/1999 | Kawakami et al. ........... 386/329 |
| 7,123,817 B2 | * | 10/2006 | Ando et al. ................... 386/264 |

FOREIGN PATENT DOCUMENTS

| | | |
|---|---|---|
| JP | H10-214462 A | 8/1998 |
| JP | 2000-132914 A | 5/2000 |
| JP | 2000-137951 A | 5/2000 |
| JP | 2004-112826 A | 4/2004 |
| KR | 10-2006-0015754 | 2/2006 |

OTHER PUBLICATIONS

Notification for Filing Opinion mailed Sep. 24, 2012 in corresponding Korean Pat. App. No. 10-2011-0092135 entitled Video Data Processing Apparatus and Video Data Processing Method in 8 pages.  
Background Art Information (Concise Explanation for JP 2004-112826), Toshiba.  
Office Action mailed Jul. 31, 2012, in corresponding Japanese Pat. App. No. 2010-22606, in 6 pages.

* cited by examiner

*Primary Examiner* — Huy T Nguyen  
(74) *Attorney, Agent, or Firm* — Knobbe, Martens, Olson & Bear, LLP (57) ABSTRACT

According to one embodiment, a video data processing apparatus includes a file receiver, an analyzer, and a recorder. The file receiver receives a data file. The analyzer analyzes the data file, divides the data file into first data blocks of first data units, and adds index information to each of the first data blocks. The index information includes particular verification data located at a first position in the index information, and management information for playback of the each first data block. The recorder records each of the first data blocks with the index information.

7 Claims, 8 Drawing Sheets

VIDEO DATA PROCESSING APPARATUS AND VIDEO DATA PROCESSING METHOD

CROSS-REFERENCE TO RELATED APPLICATIONS

This application is based upon and claims the benefit of priority from prior Japanese Patent Application No. 2010-226016, filed Oct. 5, 2010, the entire contents of which are incorporated herein by reference.

FIELD

Embodiments described herein relate generally to a video data processing apparatus and a video data processing method.

BACKGROUND

In video data processing apparatuses for recording/reading a data file containing video data and audio data, an externally input data file is recorded on a recording medium such as an optical disk, a hard disk and a semiconductor memory.

In the video data processing apparatuses, when a data file is written to and read from a recording medium, the data file is garbled with a fixed probability. If data is garbled during writing or reading audio data or video data, the data is not read accurately. In the video data processing apparatuses, to prevent occurrence of garbled data, an error correction code, such as a Reed-Solomon code, is added to a data file when writing the data file to a recording medium. Further, when reading the data file from the recording medium, if any data is garbled, garbled data is corrected based on the added error correction code.

However, if a large amount of data, which cannot be entirely corrected even based on error correction codes, has garbled in video data and/or audio data, the video data and/or audio data cannot be correctly played back. Further, part of a data file read from the recording medium may be lost in a transfer channel. Also in this case, the data file cannot be correctly played back.

DETAILED DESCRIPTION

In general, according to one embodiment, a video data processing apparatus includes a file receiver, an analyzer, and a recorder. The file receiver receives a data file. The analyzer analyzes the data file, divides the data file into first data blocks of preset data blocks, and adds index information to each of the first data blocks. The index information includes particular fixed pattern data located at a fixed position in the index information, and management information for playback of the each first data block. The recorder records each of the first data blocks with the index information.

Embodiment

An embodiment will be described with reference to the accompanying drawings.

Figure 1:
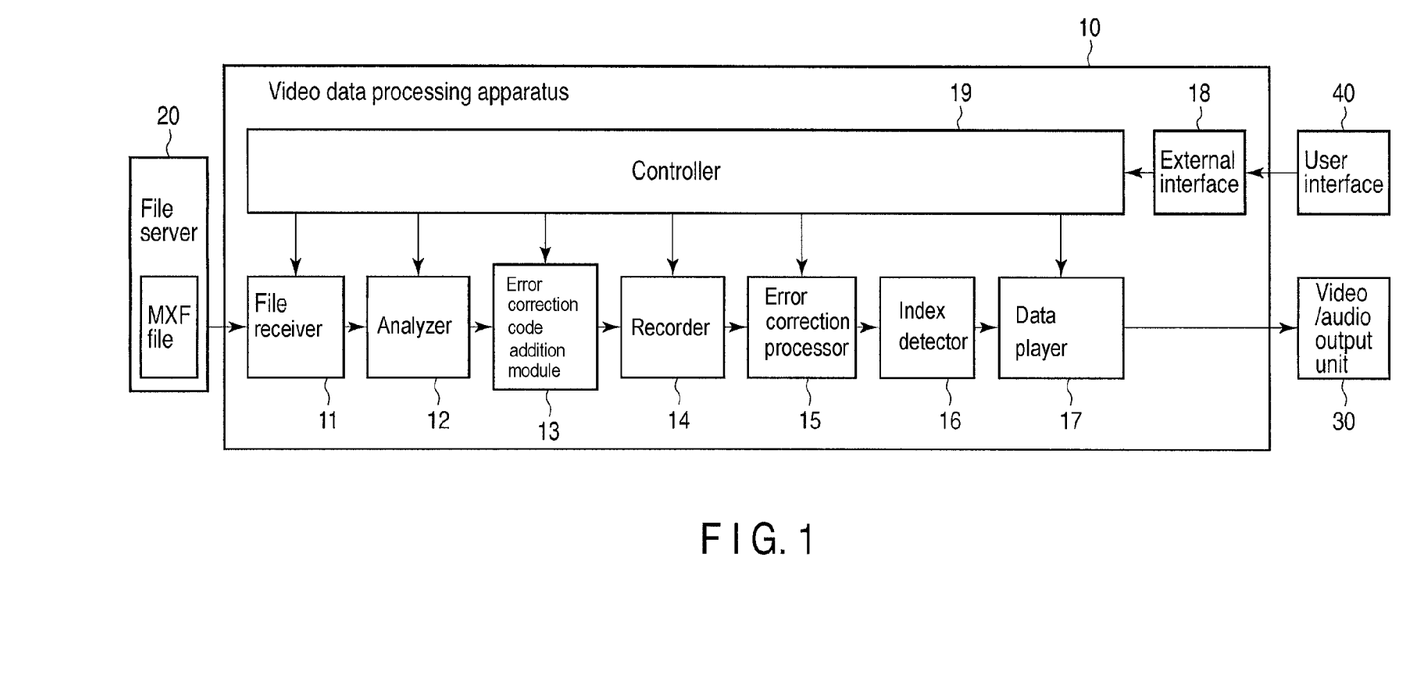
FIG. 1 is a block diagram illustrating a system configuration example including a video data processor according to an embodiment.

FIG. 1 is a block diagram illustrating a system configuration example including a video data processing apparatus 10 according to an embodiment. The video data processing apparatus 10 shown in FIG. 1 is connected, via an IP network utilizing, for example, Ethernet (a trademark), to a file server 20 that stores TV programs filed by a material exchange format (MXF). The file server 20 transfers an MXF file to the video data processing apparatus 10, using, for example, a file transfer protocol (FTP).

Figure 2:
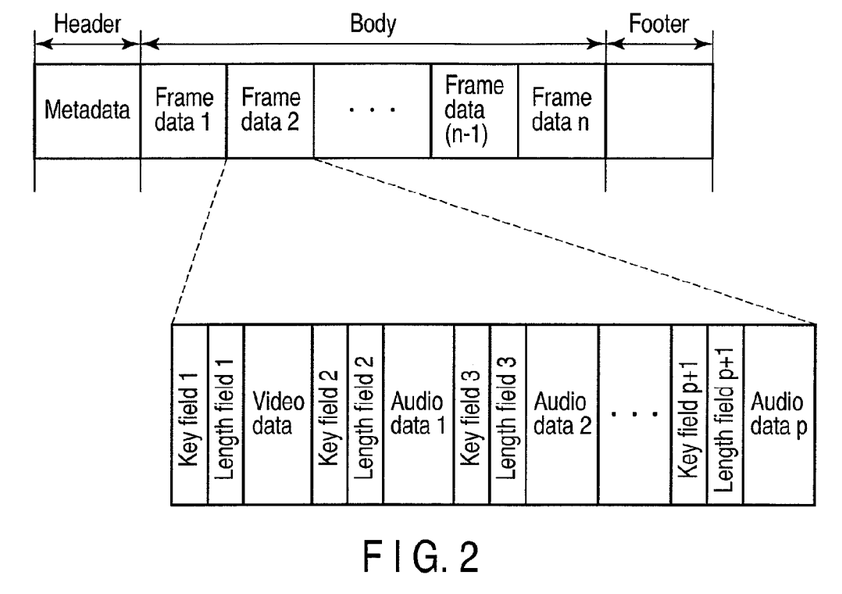
FIG. 2 is a view illustrating the logical structure of an MXF file received by the video data processing apparatus shown in FIG. 1.

FIG. 2 shows a logical structure example of the MXF file. As shown, the MXF file mainly includes a header, a body and a footer. The header is to be found at the head portion of the MXF file and includes metadata. The metadata includes information necessary to play back video/audio signals stored in the body, e.g., video codec information, information indicating the number of bits per each audio sample, group-of-picture (GOP) data, etc. The body stores a plurality of frame data blocks. The footer exists at the last portion of the MXF file and includes, for example, a random index pack.

For the frame data, a key-length-value KLV recording scheme including a key field, a length field and a value field, which are arranged repeatedly, is used.

An identification tag is included in the key field. The identification tag is used to identify the type of data included in the value field. The length field indicates the number of bytes of data included in the value field following to the length field. The data length indicated in the Length field is variable. The value field includes data, such as video data or audio data, and the value field is identified by the identification tag of the key field and having the length indicated by the length field.

In the example shown in FIG. 2, the frame data includes key field 1, length field 1, video data, key field 2, length field 2, audio data 1, key field 3, length field 3, audio data 2, ..., key field (p+1), length field (p+1) and audio data p.

The video data processing apparatus 10 shown in FIG. 1 includes a file receiver 11, an analyzer 12, an error correction code addition module 13, a recorder 14, an error correction processor 15, an index detector 16, a data player 17, an external interface 18 and a controller 19.

The controller 19 includes a central processor (CPU) formed of, for example, a microprocessor, and controls the operations of the file receiver 11, the analyzer 12, the error correction code addition module 13, the recorder 14, the error correction processor 15, the index detector 16, and the data player 17.

The file receiver 11 receives an MXF file from the file server 20 via the IP network.

The analyzer 12 analyzes the MXF file from the file server 20. More specifically, the analyzer 12 obtains video codec information, information indicating the number of bits per each audio sample, GOP information, etc., by analyzing the metadata in the header. The analyzer 12 also extracts the frame data stored in the body by analyzing the body of the MXF file to detect the key field and the length field. The analyzer 12 determines if the data in value field is video data or audio data by analyzing the key field. The analyzer 12 obtains the size of the data in value field by analyzing the length field.

The analyzer 12 divides the body into GOPs based on the acquired GOP information. The analyzer 12 further divides each GOP in a preset data size, for example, one-megabyte blocks to form a plurality of data blocks.

Also, the analyzer 12 generates index information based on the analysis result of the body and the division state. The index information includes particular fixed pattern data positioned at a fixed position, information indicating the number of data blocks into which each GOP is divided, and management information containing video data size information, audio data size information, video codec information, information indicating the number of bits per each audio sample, etc. The analyzer 12 adds the index information to a head of the beginning data block of each GOP. The analyzer 12 outputs the divided data blocks to the error correction code addition module 13.

The error correction code addition module 13 adds an error correction code, such as a Reed-Solomon correction code, to each data block received from the analyzer 12, and outputs the resultant data block to the recorder 14.

The recorder 14 includes a recording medium such as an optical disk, a hard disk, a semiconductor memory, etc. Under the write control of the controller 19, the recorder 14 writes, to the recording medium, each data block received from the error correction code addition module 13, thereby the MXF file being recorded in the recording medium. Under the read control of the controller 19, the recorder 14 reads each data block of an MXF file from the recording medium. The recorder 14 outputs the read data blocks to the error correction processor 15.

If the data block contains an error, such as garbled data, the error correction processor 15 corrects the error in the data block based on the error correction code attached to the data block containing the error. The error correction processor 15 outputs normal data blocks and the corrected data block to the index detector 16.

The index detector 16 sequentially outputs, to the data player 17, the data blocks received from the error correction processor 15.

The index detector 16 detects the index information attached to the head of the beginning data block of each GOP, and reads the pattern data located at a fixed position, the information indicating the division number, and management information, from the detected index information. The index detector 16 outputs the read management information to the data player 17.

The index detector 16 prestores reference pattern data identical to the fixed pattern data written by the analyzer 12. The index detector 16 determines if the pattern data read from the fixed position of the index information is identical to the reference pattern data. If the index detector 16 does not detect the index information, or if the read pattern data is not identical to the reference pattern data, it determines that the GOP contains an error, and outputs a stop command to the data player 17.

Further, based on the information indicating the division number read from the index information, the index detector 16 determines if the each data block of the GOP is lost. If the each data block of the GOP is not lost, the index detector 16 outputs a start command to the data player 17.

Upon receiving the start command from the index detector 16, the data player 17 performs, based on the management information, processing such as decoding on each GOP that includes a plurality of data blocks. The data player 17 outputs the video and audio signals resulting from the decoding process, to a video/audio output unit 30.

The external interface 18 is connected to a user interface 40, and receives a user instruction from the use interface 40. The user interface 40 includes a mouse, a keyboard, a display panel, etc., and receives user's instructions. Upon receiving an instruction from the user interface 40, the external interface 18 outputs the instruction to the controller 19.

The instructions received by the external interface 18 include, for example, a playback instruction for designating an MXF file recorded in the recorder 14 and playing back the designated MXF file. Upon receiving the playback instruction from the external interface 18, the controller 19 supplies the recorder 14 with a read control signal for reading out the recorded MXF file.

A detailed description will now be given of the write and read operations of the video data processing apparatus 10 constructed as the above.

Figure 3:
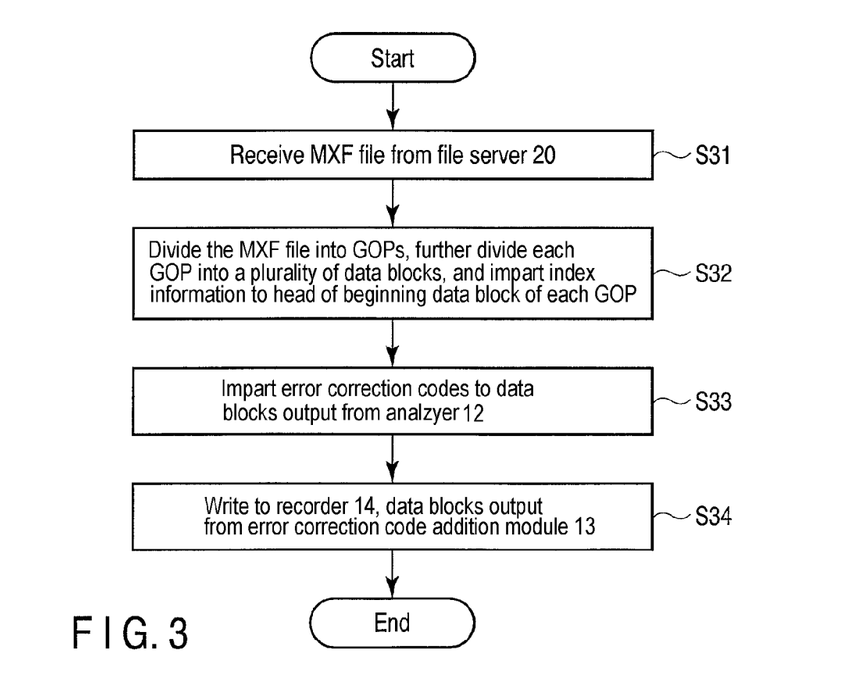
FIG. 3 is a flowchart depicting some embodiments of writing the MXF file to a recorder by the video data processing apparatus in FIG. 1.

FIG. 3 is a flowchart useful in explaining an operation example of the video data processing apparatus 10 for writing an MXF file to the recorder 14.

Figure 4:
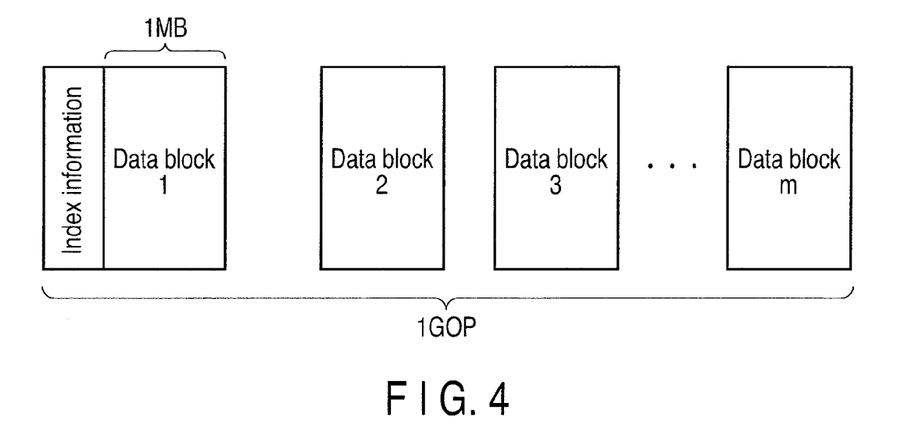
FIG. 4 is a view illustrating data produced by the analyzer shown in FIG. 1.
Figure 5:
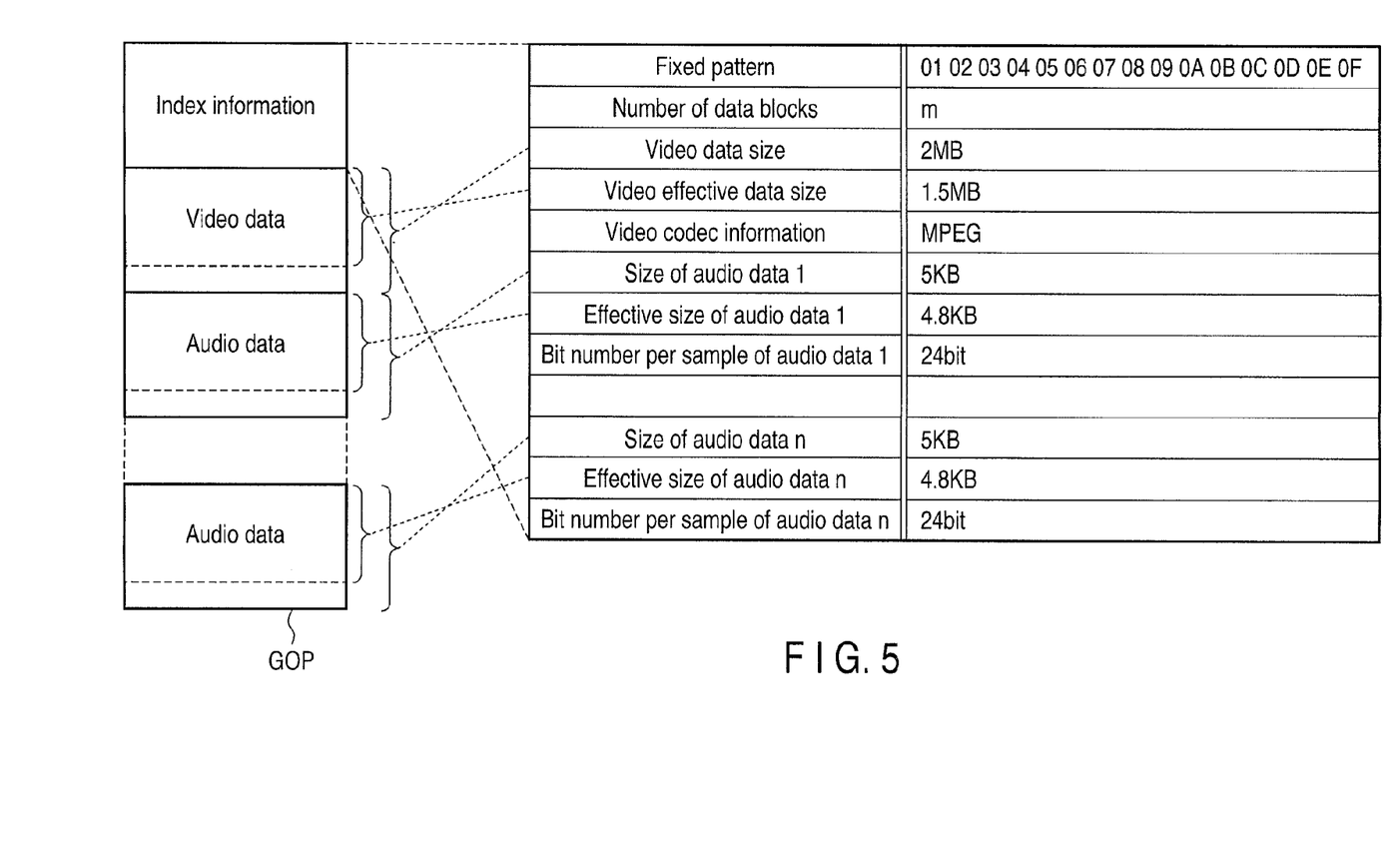
FIG. 5 is a view illustrating the index information produced by the analyzer in FIG. 1.

Firstly, the file receiver 11 receives an MXF file from the file server 20 (step S31). The analyzer 12 divides the MXF file into GOPs, and further divides each GOP in a preset data size, for example, one-megabyte blocks to form a plurality of data blocks as shown in FIG. 4. Subsequently, the analyzer 12 adds index information to a head of the beginning data block of each GOP (step S32). As shown in FIG. 5, the index information includes particular fixed pattern data, such as "01, 02, 03, 04, 05, 06, 07, 08, 09, 0A, 0B, 0C, 0D, 0E and 0F", located at a fixed position, information indicating the division number m of data blocks, and management information.

Figure 6:
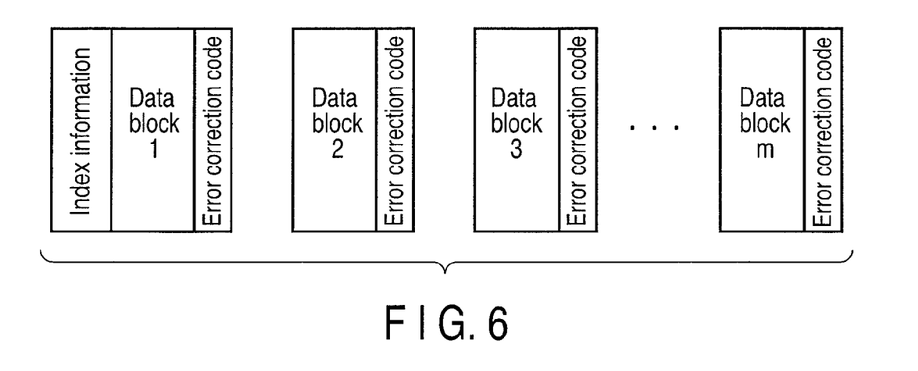
FIG. 6 is a view useful in explaining a process of adding an error correction code using the error correction code addition module in FIG. 1.

The error correction code addition module 13 adds error correction codes to the respective data blocks 1 to m output from the analyzer 12 as shown in FIG. 6 (step S33), and outputs the resultant data blocks to the recorder 14. The recorder 14 writes, to a recording medium, the data blocks 1 to m output from the error correction code addition module 13 with the error correction codes (step S34). Although in this description, a writing process of a single GOP (including data blocks 1 to m) is explained, a plurality of GOPs forming an MXF file are actually written to the recording medium.

Figure 7:
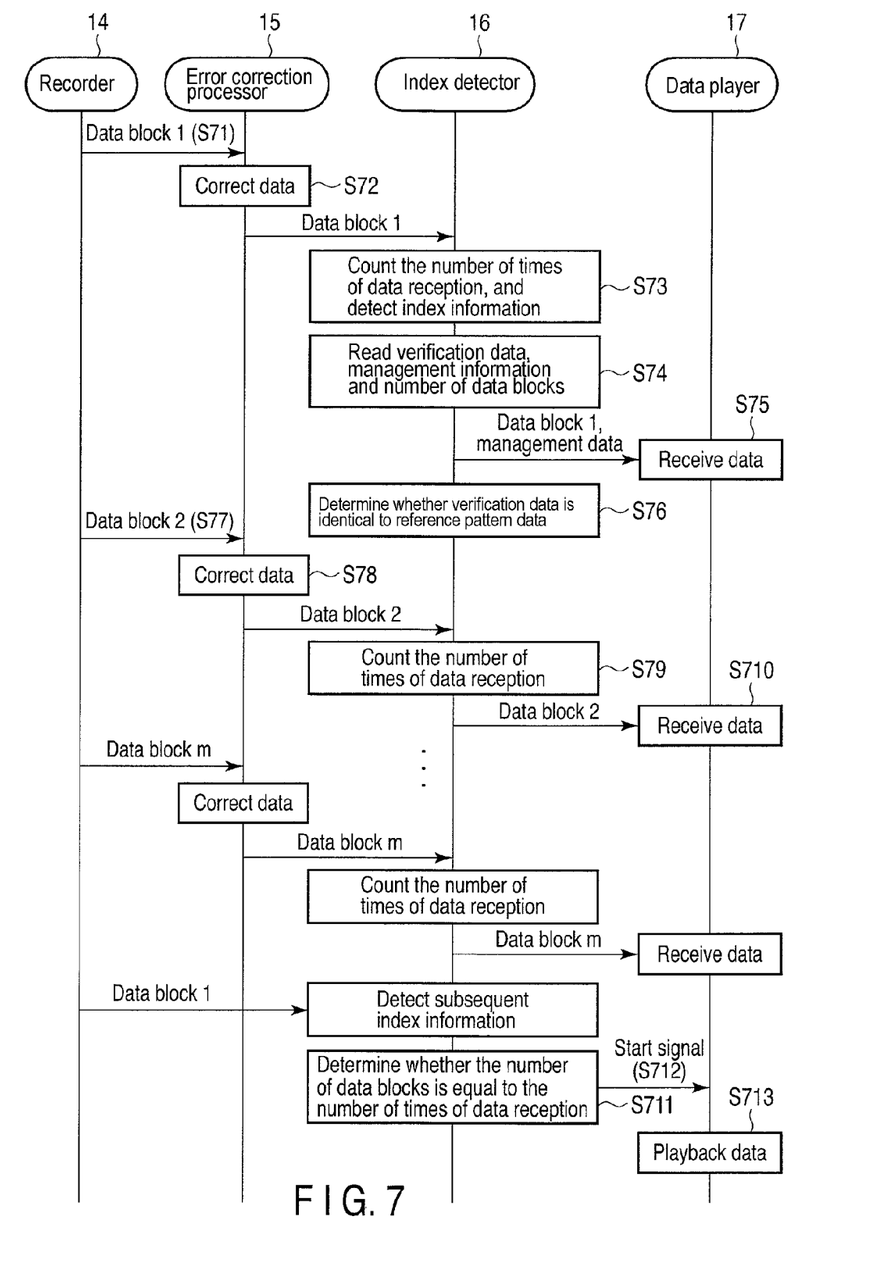
FIG. 7 is a sequence view illustrating an operation of reading the MXF file from the recorder by the video data processor in FIG. 1.

FIG. 7 is a sequence view illustrating the read operation of the video data processing apparatus 10 of the embodiment for reading an MXF file from the recorder 14.

Firstly, the recorder 14 reads data block 1 from the recording medium (sequence step S71). If data block 1 from the recorder 14 contains an error, the error correction processor 15 corrects the error based on the error correction code attached to the data block 1 (sequence step S72).

Upon receiving data block 1, the index detector 16 sets, to "1," the number of times of data reception, and detects the index information added to data block 1 (sequence step S73). Subsequently, the index detector 16 reads, from the index information, the pattern data located at a fixed position, the information indicating the division number, and the management information (sequence step S74), and outputs data block 1 and the management information to the data player 17. The data player 17 receives data block 1 and the management information from the index detector 16 (sequence step S75).

Figure 8:
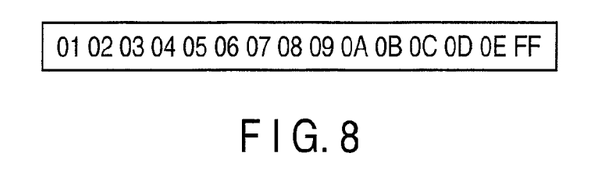
FIG. 8 is a view illustrating an example of a data pattern detected by the index detector in FIG. 1 not to agree with a reference pattern.

Subsequently, the index detector 16 detects whether the read pattern data is identical to the reference pattern data "01, 02, 03, 04, 05, 06, 07, 08, 09, 0A, 0B, 0C, 0D, 0E and 0F" (sequence step S76). If they are identical, the index detector 16 determines that the GOP in question is normal and continues the processing thereof. In contrast, if the index information is not detected, or if the read pattern data is not identical to the reference pattern data, the index detector 16 determines that the GOP in question contains an error, and outputs a stop command to the data player 17. FIG. 8 shows an example of pattern data that is not identical to the reference pattern data.

After the recorder 14 reads out data block 2 after data block 1 from the recording medium, and the recorder 14 outputs the read data block 2 to the error correction processor 15 (sequence step S77). If data block 2 outputted from the recorder 14 contains an error, the error correction processor 15 corrects the error based on the error correction code attached to the data block 2 (sequence step S78).

Upon receiving data block 2 from the error correction processor 15, the index detector 16 updates the number of times of data reception to "2" (sequence step S79), and outputs data block 2 to the data player 17. The data player 17 receives data block 2 from the index detector 16 (sequence step S710).

The video data processing application 10 iterates sequence steps S77 to S710, thereby outputting data block 2 to m to the data player 17.

When the index detector 16 detects the index information added to the head of the beginning data block of the subsequent GOP, it determines if the division number read at sequence step S74 is equal to the number of times of data reception (sequence step S711). If they are identical to each other, the index detector 16 outputs a start command to the data player 17 (sequence step S712). In contrast, if the number of times of data reception is less than the number of data block, the index detector 16 does not output the start command.

Upon receiving the start command, the data player 17 decodes the GOP in question based on the management information (sequence step S713). If the data player 17 receives the stop command from the index detector 16, it does not decode the GOP.

As described above, in the embodiment, the MXF file is divided into GOPs, and index information including fixed pattern data located at a fixed position in the index information is added to each GOP. Further, during reading, the pattern data located at the fixed position is compared with the reference pattern data, and if the pattern data located at the fixed position is not identical to the reference pattern data, it is determined that an error is contained in said each GOP. This structure enables error detection to be achieved even when the GOP in question contains a large number of errors that cannot entirely be corrected by the error correction processor 15. Further, since error detection is performed using the fixed pattern data written at the fixed position in the index information, detection processing is prevented from being made complex.

Furthermore, in the embodiment, as the MXF file is divided into GOPs, if an error occurs in a certain GOP, it does not adversely affect another GOP.

In addition, in the embodiment, the analyzer 12 divides each GOP into data blocks of a preset size. The error correction code addition module 13 adds error correction codes to respective data block, and records the data block with the error correction codes in the recorder 14. The error correction processor 15 performs error correction processing on each data block read from the recorder 14, based on the error correction code added thereto. As a result, error correction can be performed on each data block, which can minimize the data irreproducible range.

Further, in the embodiment, the index detector 16 reads the information indicating the division number from the index information, and determines if the number of times of data reception is equal to the number of data blocks. If they are equal to each other, the index detector 16 permits the data player 17 to decode the GOP in question. By virtue of this structure, even when a data block is lost, abnormal video or audio data is prevented from being erroneously output, and the bad influence of the data loss can be limited to one GOP.

Accordingly, in the video data processing apparatus of the embodiment, even when a large amount of garbled data occurs or part of a data file is lost, it can be dealt with appropriately.

Although in the above embodiment, the analyzer 12 produces data blocks from a GOP, the embodiment is not limited to this. For instance, the analyzer 12 may be modified not to divide each GOP, but to directly output each GOP with index information to the error correction code addition module 13.

Further, although in the above embodiment, index information is added in GOP units, the embodiment is not limited to this. Alternatively, the analyzer 12 may be modified to add index information in frame units. In this case, the video data processing apparatus 10 writes an MXF file to the recorder 14 in accordance with the flowchart in FIG. 9.

Figure 9:
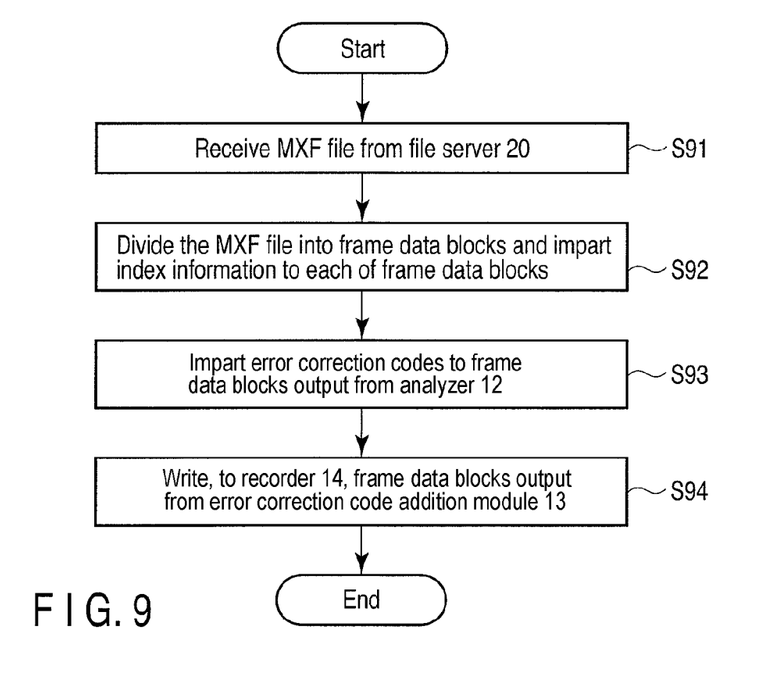
FIG. 9 is a flowchart useful in explaining another operation example of writing the MXF file to the recorder by the video data processor in FIG. 1.
Figure 10:
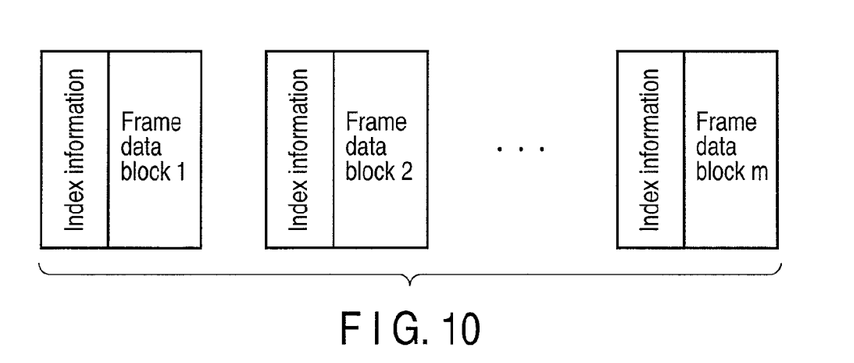
FIG. 10 is a view illustrating data frames divided by the analyzer in accordance with the operation in FIG. 9.
Figure 11:
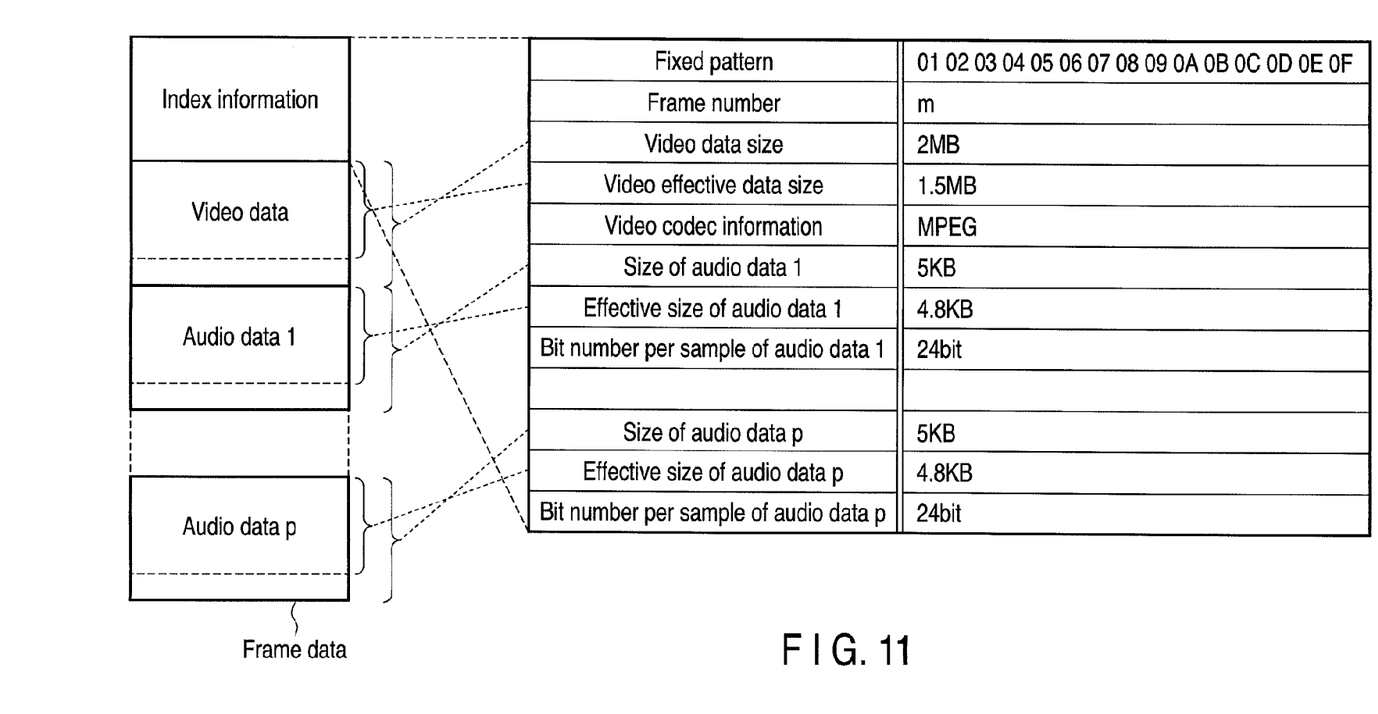
FIG. 11 is a view illustrating index information produced by the analyzer in accordance with the operation in FIG. 9.

Firstly, the file receiver 11 receives an MXF file from the file server 20 (step S91). The analyzer 12 divides the MXF file received by the file receiver 11 into frame data blocks as is shown in FIG. 10. After that, the analyzer 12 adds index information to each frame data block (step S92). The index information includes particular fixed pattern data, such as "01, 02, 03, 04, 05, 06, 07, 08, 09, 0A, 0B, 0C, 0D, 0E and 0F," located at a fixed position, a frame number and management information, as is shown in FIG. 11.

The error correction code addition module 13 adds error correction codes to the respective frame data blocks 1 to m output from the analyzer 12 (step S93), and outputs the resultant data blocks to the recorder 14. The recorder 14 writes, to the recording medium, frame data blocks 1 to m output from the error correction code addition module 13 (step S94).

Figure 12:
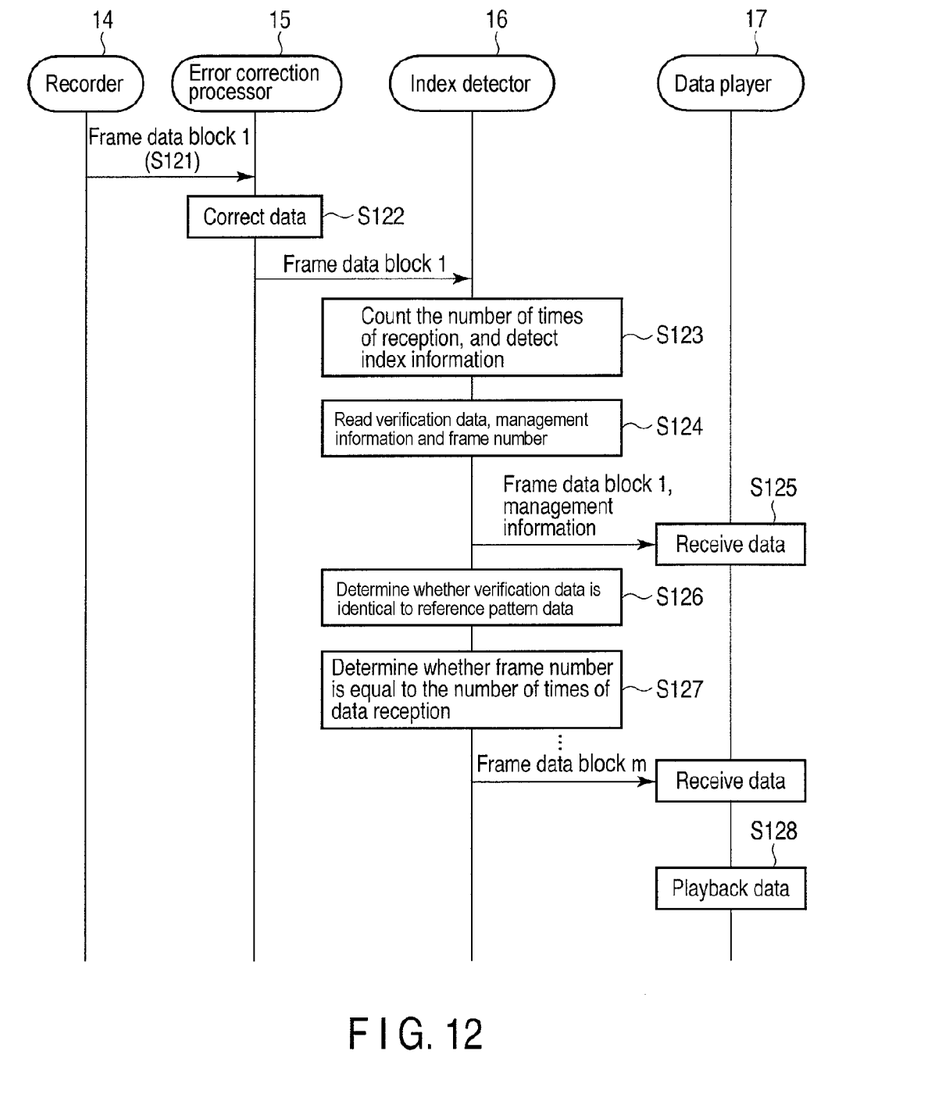
FIG. 12 is a sequence view illustrating another operation example of reading the MXF file from the recorder by the video data processor in FIG. 1.

The video data processing apparatus 10 reads an MXF file from the recorder 14 in accordance with the sequence shown in FIG. 12.

Firstly, the recorder 14 reads frame data block 1 from the recording medium (sequence step S121). If frame data block 1 output from the recorder 14 contains an error, the error correction processor 15 corrects the error based on the error correction code attached to the frame data block 1 (sequence step S122).

Upon receiving frame data block 1, the index detector 16 sets, to "1," the number of times of frame data reception, and detects the index information added to frame data block 1

(sequence step S123). Subsequently, the index detector 16 reads, from the index information, pattern data located at a fixed position, a frame number, and the management information (sequence step S124), and outputs frame data block 1 and the management information to the data player 17 (sequence step S125).

Subsequently, the index detector 16 detects whether the read pattern data is identical to the reference pattern data "01, 02, 03, 04, 05, 06, 07, 08, 09, 0A, 0B, 0C, 0D, 0E and 0F" (sequence step S126). If they are identical, the index detector 16 determines that frame data block 1 is normal and continues the processing thereof. In contrast, if the index information is not detected, or if the read pattern data is not identical to the reference pattern data, the index detector 16 determines that frame data block 1 contains an error, and outputs a first stop command to the data player 17.

Further, the index detector 16 determines if the number of times of data reception is equal to the frame number (sequence step S127). If the number of times of data reception is less than the frame number, the index detector 16 determines that a frame data block is lost, and outputs a second stop command to the data player 17.

The video data processing application 10 iterates sequence steps S121 to S127, thereby outputting frame data blocks 1 to m to the data player 17.

After the data player 17 receives frame data block constituting one GOP, the data player 17 decodes the frame data constituting one GOP based on the management information (sequence step S128). If the data player 17 receives the first or second stop command from the index detector 16, it does not decode the frame data block.

As described above, even when the frame data contains a large number of errors that cannot all be corrected by the error correction processor 15, error detection can be achieved. Further, since the index detector 16 detects if the number of times of frame data reception is equal to the frame number, and determines that a frame data block is lost if the numbers are unequal to each other, the bad influence of the data lost can be limited to one GOP.

Further, in the embodiment, the index information is added to each GOP or each frame data block, although the index information is not limited to this embodiment. For instance, the index information may be added to each of the data blocks into which each GOP is further divided. In this case, the index information includes management information corresponding to each data block.

In addition, in the above embodiment, the file receiver 11 is configured to receive the MXF file, it may be configured to receive another type of file, although the file receiver is not limited to the above. It is sufficient if the data structure of the file can be analyzed by the analyzer 12.

Furthermore, in the above embodiment, the error correction code addition module 13 adds an error correction code, and the error correction processor 15 performs error correction processing, although the scope of the inventions is not limited to the above embodiment. For instance, the video data processing apparatus 10 may include neither of the error correction code addition module 13 and the error correction processor 15.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video data processing apparatus comprising:
   a file receiver configured to receive a data file;
   an analyzer configured to analyze the data file, to divide the data file into first data blocks that are groups of picture (GOPs), and to add index information to each first data block, the index information comprising pattern data located at a first position in the index information, and management information for playback of each first data block;
   a recorder configured to record each first data block with the index information;
   a detector configured to detect the index information added to the first data blocks from the recorder, to read the management information from the index information, to read verification data from the first position in the index information, and to issue a stop command if the verification data is absent, or if the verification data is different from the pattern data; and
   a data player configured to play back the read first data blocks with reference to the management information in absence of the stop command, and to disable playing back the first data blocks in presence of the stop command.

2. The video data processing apparatus of claim 1, wherein
   the analyzer is further configured to divide each first data block into a plurality of second data blocks comprising a first data size, and to add the index information to a head of a beginning block of the second data blocks, wherein the index information further comprises division number information indicative of a division number of the second data blocks,
   the recorder is configured to record the first data blocks in which the index information is added to the head of the beginning block,
   the detector is configured to read the division number from the index information that is added to the second data blocks read from the recorder, and to issue a start command when the number of second data blocks read from the recorder is same as the division number, and
   the data player is configured to play back the first data block comprising the read second data blocks, with reference to the management information in presence of the start command.

3. The video data processing apparatus of claim 2, wherein
   the index information comprises management information of each second data block; and
   the analyzer is further configured to add the index information to the respective second data blocks.

4. The video data processing apparatus of claim 2, further comprising:
   an error correction code addition module configured to add error correction codes to the second data blocks and to output to the recorder the second data blocks to which the error correction codes are added; and
   an error correction processor configured to detect whether one of the second data blocks from the recorder contains an error, to correct the error based on the error correction code in the second data block containing the error if the error is detected, and to output the error-corrected second data block to the detector.

5. A video data processing apparatus comprising:
   a file receiver configured to receive a data file;

an analyzer configured to divide the data file into a plurality of first data blocks that are frame data blocks, the first data blocks comprising a first data size, and to add index information to each first data block, the index information comprising pattern data located at a first position in the index information, a frame number, and management information for playback of each first data block;

a recorder configured to record each first data block with the index information;

a detector configured to detect the index information added to the first data blocks read from the recorder, to read the frame number and the management information, to read verification data from the first position, to issue a first stop command if the verification data is different from the pattern data, to issue a second stop command when the number of first data blocks read from the recorder is different from the frame number; and a data player configured to play back the read first data block with reference to the management information, and to disable playing back the first data block in presence of the first or second stop command.

6. The video data processing apparatus of claim 5, further comprising:

an error, correction code addition module configured to add an error correction code to the first data blocks and output the first data blocks with the error correction code to the recorder; and an error correction processor configured to detect whether one of the first data blocks from the recorder contains an error, to correct the error based on the error correction code in the first data block containing the error, if the error is detected, and to output the error-corrected first data block to the detector.

7. A video data processing method comprising:

receiving a data file;

dividing the data file into data blocks;

adding index information to each data blocks, the index information comprising pattern data located at a first position in the index information, and management information for playback of each data block;

recording, in a recorder, the data blocks with the index information;

reading the data blocks from the recorder;

detecting the index information in the read data blocks;

reading the management information from the index information and verification data from the first position in the index information;

issuing a stop command if the index information is absent, or if the verification data is different from the pattern data; and playing back the read data blocks in absence of the stop command, and disabling playing back the data block in presence of the stop command.

* * * * *